United States Patent
Kohzuki et al.

(10) Patent No.: US 10,040,961 B2
(45) Date of Patent: Aug. 7, 2018

(54) CLEANING SOLUTION, SET OF INK AND CLEANING SOLUTION, CLEANING SOLUTION STORED CONTAINER, INKJET PRINTING APPARATUS, AND INKJET PRINTING METHOD

(71) Applicants: Shizuka Kohzuki, Kanagawa (JP); Akiko Bannai, Kanagawa (JP)

(72) Inventors: Shizuka Kohzuki, Kanagawa (JP); Akiko Bannai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/385,206

(22) Filed: Dec. 20, 2016

(65) Prior Publication Data
US 2017/0183528 A1    Jun. 29, 2017

(30) Foreign Application Priority Data

Dec. 24, 2015 (JP) .................... 2015-252173
Oct. 20, 2016 (JP) .................... 2016-206058

(51) Int. Cl.

| | | |
|---|---|---|
| C09D 11/54 | (2014.01) | |
| C11D 3/43 | (2006.01) | |
| C11D 3/30 | (2006.01) | |
| C11D 3/24 | (2006.01) | |
| C11D 1/00 | (2006.01) | |
| C09D 11/30 | (2014.01) | |
| C09D 11/322 | (2014.01) | |
| C09D 11/107 | (2014.01) | |

(Continued)

(52) U.S. Cl.
CPC ........... *C09D 11/54* (2013.01); *B41J 2/16552* (2013.01); *C09D 11/102* (2013.01); *C09D 11/107* (2013.01); *C09D 11/30* (2013.01); *C09D 11/322* (2013.01); *C11D 1/004* (2013.01); *C11D 3/245* (2013.01); *C11D 3/30* (2013.01); *C11D 3/43* (2013.01)

(58) Field of Classification Search
None
See application file for complete search history.

(56) References Cited

U.S. PATENT DOCUMENTS

2010/0028625 A1* 2/2010 Kagata ............... C09D 11/322
                                                            428/195.1
2012/0309661 A1  12/2012 Adams et al.
(Continued)

FOREIGN PATENT DOCUMENTS

JP     07-268390     10/1995
JP     2011-140556   7/2011
(Continued)

OTHER PUBLICATIONS

Machine Translation of Adams et al. (WO 2011089238 A1), "Low-Voc Solvent Systems", Jul. 28, 2011, Sun-Chem Corp, [p. 1, Paragraphs 1-8 and p. 3, Paragraph 5].*

*Primary Examiner* — Lisa M Solomon
(74) *Attorney, Agent, or Firm* — Oblon, McClelland, Maier & Neustadt, L.L.P.

(57) ABSTRACT

Provided is a cleaning solution used for cleaning an ink containing a resin in an amount of 5 percent by mass or greater, the cleaning solution including a mixture solvent containing water and a solvent, wherein a hydrogen bond term of a Hansen solubility parameter of the mixture solvent is 7.0 $(cal/cm^3)^{1/2}$ or less.

19 Claims, 2 Drawing Sheets

(51) Int. Cl.
*C09D 11/102* (2014.01)
*B41J 2/165* (2006.01)

(56) References Cited

U.S. PATENT DOCUMENTS

2014/0107007 A1* 4/2014 Sao .................... B41J 2/16552
                                                                510/170
2014/0240393 A1   8/2014 Mukai et al.

FOREIGN PATENT DOCUMENTS

| JP | 2013-056454 | 3/2013 | |
|----|---|---|---|
| JP | 2013-518138 | 5/2013 | |
| JP | 2014-162819 | 9/2014 | |
| WO | WO 2011089238 A1 * | 7/2011 | ............. C09D 7/001 |

* cited by examiner

CLEANING SOLUTION, SET OF INK AND CLEANING SOLUTION, CLEANING SOLUTION STORED CONTAINER, INKJET PRINTING APPARATUS, AND INKJET PRINTING METHOD

CROSS-REFERENCE TO RELATED APPLICATIONS

The present application claims priority under 35 U.S.C. § 119 to Japanese Patent Application No. 2015-252173, filed Dec. 24, 2015 and Japanese Patent Application No. 2016-206058, filed Oct. 20, 2016. The contents of which are incorporated herein by reference in their entirety.

BACKGROUND OF THE INVENTION

Field of the Invention

The present disclosure relates to a cleaning solution, a set of an ink and a cleaning solution, a cleaning solution stored container, an inkjet printing apparatus, and an inkjet printing method.

Description of the Related Art

Hitherto, dye inks have been the mainstream among inkjet inks owing to, for example, a good chromogenicity and a high reliability. Recently, however, it has become more common to use pigment inks, because the dye inks are poor in water resistance and light resistance.

The pigment inks have come to be used also in commercial printing using, for example, high-speed continuous feed printers. It has become standard that the pigment inks contain resins in order to secure a high-speed drying property (high-speed fixability) and fixability on lowly ink-absorbable print media, which the pigment inks need to have in order to be used in the high-speed continuous feed printers. However, when the pigment inks contain resins, for example, the inks may adhere, cohere, and dry in printing heads in high-speed printing. This may degrade discharging stability of the inks and needs the adhered inks in the printing heads to be cleaned away in order to secure discharging stability of the inks.

However, because the inks containing the resins firmly adhere in the printing heads, there is a problem that existing cleaning solutions are insufficient in cleaning power.

Hence, there is proposed a cleaning solution containing polyoxyalkylenemonoalkyl ether, glycerin, and water (see, e.g., Japanese Patent No. 5618250).

There is also proposed an ink set including a printing ink containing a resin and a substitute ink containing an active agent and a solvent (see, e.g., Japanese Unexamined Patent Application Publication No. 2014-162819).

There is also proposed a cleaning composition in which a solvent system has a prescribed Hansen solubility parameter (see, e.g., Japanese Translation of PCT International Application Publication No. JP-T-2013-518138).

SUMMARY OF THE INVENTION

According to one aspect of the present disclosure, a cleaning solution is a cleaning solution used for cleaning an ink containing a resin in an amount of 5 percent by mass or greater. The cleaning solution contains a mixture solvent containing water and a solvent. A hydrogen bond term of a Hansen solubility parameter of the mixture solvent is 7.0 $(cal/cm^3)^{1/2}$ or less.

DESCRIPTION OF THE EMBODIMENTS (Cleaning Solution, and Set of Ink and Cleaning Solution)

A cleaning solution of the present disclosure is a cleaning solution used for cleaning an ink containing a resin in an amount of 5 percent by mass or greater. The cleaning solution contains a mixture solvent containing water and a solvent. A hydrogen bond term of a Hansen solubility parameter of the mixture solvent is 7.0 $(cal/cm^3)^{1/2}$ or less. The cleaning solution further contains other components as needed.

The cleaning solution of the present disclosure is based on a finding that existing cleaning solutions are effective for cleaning, for example, adhesions in printing heads, of inks containing resin-coated pigments or inks containing resins alone in an amount of 2% by mass or less, but have insufficient cleaning powers against adhesions of inks containing resins in an amount of 5% by mass or greater.

A set of an ink and a cleaning solution of the present disclosure is a set of an ink and a cleaning solution. The ink contains a resin. The proportion of the resin is 5 percent by mass or greater of the total amount of the ink. The cleaning solution is a cleaning solution of the present disclosure and further contains other components as needed.

The present disclosure has an object to provide a cleaning solution excellent in cleanability.

The present disclosure can provide a cleaning solution excellent in clean ability.

<Cleaning Solution>

The cleaning solution is not particularly limited and may be appropriately selected depending on the intended purpose, so long as a hydrogen bond term of a Hansen solubility parameter of a mixture solvent contained in the cleaning solution is 7.0 $(cal/cm^3)^{1/2}$ or less.

<<Mixture Solvent>>

The mixture solvent contains water and a solvent. A hydrogen bond term of a Hansen solubility parameter of the mixture solvent is 7.0 $(cal/cm^3)^{1/2}$ or less.

[Hydrogen Bond Term of Hansen Solubility Parameter]

The hydrogen bond term (may hereinafter be referred to as "δH") of the Hansen solubility parameter (may hereinafter be referred to as "HSP") of the mixture solvent is 7.0 $(cal/cm^3)^{1/2}$ or less and preferably 5.0 $(cal/cm^3)^{1/2}$ or greater but 6.8 $(cal/cm^3)^{1/2}$ or less. When the hydrogen bond term of the Hansen solubility parameter of the mixture solvent is 7.0 $(cal/cm^3)^{1/2}$ or less, the cleaning power can be improved and a better discharging reliability can be obtained.

The Hansen solubility parameter (HSP) is a representation of a solubility parameter (SP) introduced by Hildebrand in a three-dimensional space by means of division of the solubility parameter into three components including a dispersion term (δD), a polarity term (δP), and a hydrogen bond term (δH). The dispersion term (δD) is a term based on van der Waals short-range force. The polarity term (δP) is also referred to as polarization term, and is a term attributed to, for example, a dipole moment and a dielectric constant. The hydrogen bond term (δH) includes an intermolecular force based on hydrogen bonding and π-π interaction that cannot be classified into the others. The hydrogen bond term (δH) is used in the present disclosure.

The three components including the dispersion term (δD), the polarity term (δP), and the hydrogen bond term (δH) have often been calculated by Hansen and successors of the Hansen's studies, and are described in detail in *Polymer*

Handbook, fourth edition, VII-698-711. The definition and calculation of HSP are described in a document identified below.

Hansen, Charles M. *Hansen Solubility Parameters: A Users Handbook*, CRC Press, Inc., 2007.

Hansen solubility parameter values of many solvents and resins have been studied, and are described in, for example, Archer, Wesley L. *Industrial Solvents Handbook*.

The hydrogen bond term ($\delta H$) of the Hansen solubility parameter of the mixture solvent can be calculated according to a formula (1) described below.

Hydrogen bond term ($\delta H$) of Hansen solubility parameter of mixture solvent=$[\{(\delta H \text{ of water}) \times (\text{percent by volume of water in mixture solvent})\}/100] + [\{(\delta H \text{ of solvent}) \times (\text{percent by volume of solvent in mixture solvent})\}/100]$ —Solvent—

The solvent is not particularly limited and may be appropriately selected depending on the intended purpose, so long as the solvent can adjust the hydrogen bond term of the Hansen solubility parameter. However, an organic solvent is preferable and a water-soluble organic solvent is more preferable. For example, water solubility means that a substance dissolves in an amount of 5 g or more in water (100 g) having a temperature of 25 degrees C.

Examples of the water-soluble organic solvent include: polyols; ethers such as polyol alkyl ethers and polyol aryl ethers; nitrogen-containing heterocyclic compounds; amides; amines; sulfur-containing compounds; propylene carbonate ($\delta H$ of HSP: 2.00 $(cal/cm^3)^{1/2}$); and ethylene carbonate ($\delta H$ of HSP: 2.49 $(cal/cm^3)^{1/2}$).

Examples of the polyols include ethylene glycol ($\delta H$ of HSP: 12.7 $(cal/cm^3)^{1/2}$), diethylene glycol ($\delta H$ of HSP: 9.27 $(cal/cm^3)^{1/2}$), 1,2-propanediol ($\delta H$ of HSP: 3.31 $(cal/cm^3)^{1/2}$), 1,3-propanediol ($\delta H$ of HSP: 11.3 $(cal/cm^3)^{1/2}$, specific gravity: 1.005), 1,2-butanediol ($\delta H$ of HSP: 10.2 $(cal/cm^3)^{1/2}$, specific gravity: 1.002), 1,3-butanediol ($\delta H$ of HSP: 9.37 $(cal/cm^3)^{1/2}$, specific gravity: 1.005), 1,4-butanediol ($\delta H$ of HSP: 10.2 $(cal/cm^3)^{1/2}$), 3-methyl-1,3-butanediol ($\delta H$ of HSP: 8.19 $(cal/cm^3)^{1/2}$), 2,3-butanediol ($\delta H$ of HSP: 8.19 $(cal/cm^3)^{1/2}$), triethylene glycol ($\delta H$ of HSP: 9.07 $(cal/cm^3)^{1/2}$), 1,5-pentanediol ($\delta H$ of HSP: 9.65 $(cal/cm^3)^{1/2}$), 1,6-hexanediol ($\delta H$ of HSP: 8.68 $(cal/cm^3)^{1/2}$), glycerin ($\delta H$ of HSP: 13.3 $(cal/cm^3)^{1/2}$), 3-methoxy-3-methyl-1-butanol ($\delta H$ of HSP: 6.29 $(cal/cm^3)^{1/2}$, specific gravity: 0.927), and 3-ethyl-3-oxetanemethanol ($\delta H$ of HSP: 6.05 $(cal/cm^3)^{1/2}$, specific gravity: 1.019). One of these polyols may be used alone or two or more of these polyols may be used in combination.

Examples of the polyol alkyl ethers include ethylene glycol monoethyl ether ($\delta H$ of HSP: 6.83 $(cal/cm^3)^{1/2}$), ethylene glycol monobutyl ether ($\delta H$ of HSP: 6.00 $(cal/cm^3)^{1/2}$), diethylene glycol monomethyl ether ($\delta H$ of HSP: 6.14 $(cal/cm^3)^{1/2}$), diethylene glycol monoethyl ether ($\delta H$ of HSP: 5.95 $(cal/cm^3)^{1/2}$), diethylene glycol diethyl ether ($\delta H$ of HSP: 2.73 $(cal/cm^3)^{1/2}$), diethylene glycol monobutyl ether ($\delta H$ of HSP: 5.17 $(cal/cm^3)^{1/2}$), propylene glycol monoethyl ether ($\delta H$ of HSP: 5.12 $(cal/cm^3)^{1/2}$), propylene glycol monopropyl ether ($\delta H$ of HSP: 4.48 $(cal/cm^3)^{1/2}$), propylene glycol monobutyl ether ($\delta H$ of HSP: 4.48 $(cal/cm^3)^{1/2}$), propylene glycol monoisobutyl ether ($\delta H$ of HSP: 4.78 $(cal/cm^3)^{1/2}$), diethylene glycol dibutyl ether ($\delta H$ of HSP: 2.14 $(cal/cm^3)^{1/2}$), and dipropylene glycol mono-n-butyl ether ($\delta H$ of HSP: 4.87 $(cal/cm^3)^{1/2}$). One of these polyol alkyl ethers may be used alone or two or more of these polyol alkyl ethers may be used in combination.

Examples of the polyol aryl ethers include ethylene glycol monophenyl ether and ethylene glycol monobenzyl ether.

Examples of the nitrogen-containing heterocyclic compounds include 2-pyrrolidone ($\delta H$ of HSP: 4.39 $(cal/cm^3)^{1/2}$, specific gravity: 1.1), N-methyl-2-pyrrolidone ($\delta H$ of HSP: 3.51 $(cal/cm^3)^{1/2}$), and ε-caprolactam ($\delta H$ of HSP: 1.90 $(cal/cm^3)^{1/2}$). One of these nitrogen-containing heterocyclic compounds may be used alone or two or more of these nitrogen-containing heterocyclic compounds may be used in combination.

Examples of the amides include formamide ($\delta H$ of HSP: 9.27 $(cal/cm^3)^{1/2}$), N-methylformamide ($\delta H$ of HSP: 7.76 $(cal/cm^3)^{1/2}$), and N,N-dimethylformamide ($\delta H$ of HSP: 5.51 $(cal/cm^3)^{1/2}$). One of these amides may be used alone or two or more of these amides may be used in combination.

Examples of the amines include monoethanolamine ($\delta H$ of HSP: 10.2 $(cal/cm^3)^{1/2}$) and diethanolamine ($\delta H$ of HSP: 9.67 $(cal/cm^3)^{1/2}$). One of these amines may be used alone or two or more of these amines may be used in combination.

Examples of the sulfur-containing compounds include dimethylsulfoxide ($\delta H$ of HSP: 4.98 $(cal/cm^3)^{1/2}$) and sulfolane ($\delta H$ of HSP: 4.24 $(cal/cm^3)^{1/2}$). One of these sulfur-containing compounds may be used alone or two or more of these sulfur-containing compounds may be used in combination.

Among these solvents, solvents of which hydrogen bond term of the Hansen solubility parameter is 5 $(cal/cm^3)^{1/2}$ or less are preferable. Dipropylene glycol mono-n-butyl ether ($\delta H$ of HSP: 4.87 $(cal/cm^3)^{1/2}$), 2-pyrrolidone ($\delta H$ of HSP: 4.39 $(cal/cm^3)^{1/2}$), diethylene glycol diethyl ether ($\delta H$ of HSP: 2.73 $(cal/cm^3)^{1/2}$), propylene glycol monobutyl ether ($\delta H$ of HSP: 4.48 $(cal/cm^3)^{1/2}$), diethylene glycol dibutyl ether ($\delta H$ of HSP: 2.14 $(cal/cm^3)^{1/2}$), propylene glycol monoisobutyl ether ($\delta H$ of HSP: 4.78 $(cal/cm^3)^{1/2}$), propylene glycol monopropyl ether ($\delta H$ of HSP: 4.48 $(cal/cm^3)^{1/2}$), a compound represented by general formula (1) below ($R^1$ represents a methyl group, $\delta H$ of HSP: 4.63 $(cal/cm^3)^{1/2}$, specific gravity 0.99), a compound represented by general formula (1) below ($R^1$ represents an ethyl group, $\delta H$ of HSP: 3.65 $(cal/cm^3)^{1/2}$, specific gravity: 0.97), and a compound represented by general formula (1) below ($R^1$ represents a butyl group, $\delta H$ of HSP: 3.26 $(cal/cm^3)^{1/2}$) are more preferable. The compound represented by general formula (1) below ($R^1$ represents a methyl group, $\delta H$ of HSP: 4.63 $(cal/cm^3)^{1/2}$) and the compound represented by general formula (1) below ($R^1$ represents an ethyl group, $\delta H$ of HSP: 3.65 $(cal/cm^3)^{1/2}$) are particularly preferable.

General formula (1)

In general formula (1), $R^1$ represents an alkyl group containing 1 or more but 4 or less carbon atoms.

The hydrogen bond term of the Hansen solubility parameter of the solvent is preferably 5 $(cal/cm^3)^{1/2}$ or less. When the hydrogen bond term of the Hansen solubility parameter of the solvent is 5 $(cal/cm^3)^{1/2}$ or less, the cleaning power can be improved, and discharging reliability can be improved.

The hydrogen bond term of the Hansen solubility parameter of the solvent can be obtained with software HSPIP available from Charles M. Hansen Consulting (Horsholm, Denmark, hansen-solubility.com). The method for obtaining the hydrogen bond term of the Hansen solubility parameter of a solvent of which hydrogen bond term of the Hansen solubility parameter is unknown, using the HSPIP software will be described below.

As of October, 2015, the hydrogen bond term of the Hansen solubility parameter can be obtained using HSPIP version 4.1 software available from http://www.pirika.com/.

Using a tool for predicting HSP included in the HSPIP, the hydrogen bond term of the Hansen solubility parameter of the solvent can be obtained from a chemical structure (main chain and functional group) according to modified SMILES representation. In the present disclosure, the values registered in the database of HSPIP version 3.0.38 are used for any solvents of which values are registered in the database (see various documents about HSP for such solvents), and values estimated using the HSPIP are used for any solvents of which values are not registered in the database.

The proportion of the solvent is preferably 60 percent by mass or greater and more preferably 70 percent by mass or greater but 80 percent by mass or less of the total amount of the cleaning solution.

—Water—

The water is not particularly limited and may be appropriately selected depending on the intended purpose. Examples of the water include pure water such as ion-exchanged water, ultrafiltrated water, reverse osmotic water, and distilled water, and ultrapure water. One of these kinds of water may be used alone or two or more of these kinds of water may be used in combination.

The proportion of the water is not particularly limited, may be appropriately selected depending on the intended purpose, and is preferably 10 percent by mass or greater but 30 percent by mass or less and more preferably 10 percent by mass or greater but 20 percent by mass or less.

The ratio by mass (water/solvent) of the proportion (percent by mass) of the water to the proportion (percent by mass) of the solvent in the mixture solvent is not particularly limited and may be appropriately selected depending on the intended purpose, so long as the value of the hydrogen bond term of the Hansen solubility parameter of the mixture solvent can be the desired value. However, the ratio by mass (water/solvent) is preferably 0.1 or greater but 0.4 or less and more preferably 0.1 or greater but 0.25 or less.

<<Other Components>>

Examples of the other components include a surfactant, a defoaming agent, a preservative and fungicide, a corrosion inhibitor, and a pH regulator.

—Surfactant—

The surfactant is not particularly limited and may be appropriately selected depending on the intended purpose. For example, a fluorosurfactant is preferable and 2-perfluoroalkylethanol is more preferable.

The surfactant may be an appropriately synthesized product or a commercially available product. Examples of the commercially available product include ZONYL (registered trademark) FSO-100 (available from Du Pont Kabushiki Kaisha).

—Defoaming Agent—

The defoaming agent is not particularly limited and may be appropriately selected depending on the intended purpose. Examples of the defoaming agent include 2,4,7,9-tetramethyl-4,7-decanediol.

<Ink>

The ink contains a resin, preferably contains a solvent and a coloring material, and further contains other components as needed.

<<Resin>>

The resin is not particularly limited and may be appropriately selected depending on the intended purpose, so long as the resin is contained in the ink in an amount of 5 percent by mass or greater of the total amount of the ink.

The hydrogen bond term of the Hansen solubility parameter of the resin is preferably 8 $(cal/cm^3)^{1/2}$ or less and more preferably 5.5 $(cal/cm^3)^{1/2}$ or greater but 7.3 $(cal/cm^3)^{1/2}$ or less.

To obtain the hydrogen bond term of the Hansen solubility parameter of the resin, the resin may be added to various solvents varied in the hydrogen bond term of the Hansen solubility parameter, and the hydrogen bond term of the Hansen solubility parameter of the solvent in which the resin dissolves may be determined as the hydrogen bond term of the Hansen solubility parameter of the resin. When the ink contains a plurality of resins, in the same manner as described above, the plurality of resins may be added simultaneously to the solvents, and the hydrogen bond term of the Hansen solubility parameter of the solvent in which the plurality of resins dissolve may be determined as the hydrogen bond term of the Hansen solubility parameter of the plurality of resins.

[Difference Between Hydrogen Bond Term of Hansen Solubility Parameter of Resin in Ink and Hydrogen Bond Term of Hansen Solubility Parameter of Mixture Solvent in Cleaning Solution]

Difference between the hydrogen bond term of the Hansen solubility parameter of the resin in the ink and the hydrogen bond term of the Hansen solubility parameter of the mixture solvent in the cleaning solution is preferably 1.0 $(cal/cm^3)^{1/2}$ or less and more preferably 0.5 $(cal/cm^3)^{1/2}$ or less.

The resin is not particularly limited and may be appropriately selected depending on the intended purpose. Examples of the resin include urethane resins, polyester resins, acrylic resins, vinyl acetate-based resins, styrene-based resins, butadiene-based resins, styrene-butadiene-based resins, vinyl chloride-based resins, acrylic styrene-based resins, and acrylic silicone-based resins. It is possible to use resin particles formed of these resins. Among these resins, acrylic resins (e.g., a representative value of δH of HSP: 3.98 $(cal/cm^3)^{1/2}$), polycarbonate-based urethane resins (e.g., a representative value of δH of HSP: 5.24 $(cal/cm^3)^{1/2}$), and polyether-based urethane resins (e.g., a representative value of δH of HSP: 7.30 $(cal/cm^3)^{1/2}$) are preferable.

To obtain the ink, the resin particles may be mixed with materials such as a coloring material and an organic solvent in a state of a resin emulsion obtained by dispersing the resin particles in water, which is a dispersion medium. The resin particles may be an appropriately synthesized product or a commercially available product. One of these kinds of resin particles may be used alone or two or more of these kinds of resin particles may be used in combination.

The volume average particle diameter of the resin particle is not particularly limited and can be suitably selected to suit to a particular application. The volume average particle diameter is preferably from 10 through 1,000 nm, more preferably from 10 through 200 nm, and furthermore preferably from 10 through 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 through 30 percent by mass and more preferably from 5 through 20 percent by mass to the total content of the ink.

The particle diameter of the solid portion in ink has no particular limit and can be suitably selected to suit to a particular application. For example, the maximum frequency in the maximum number conversion is preferably from 20 through 1,000 nm and more preferably from 20 through 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracSEL Corp).

<<Solvent>>

The solvent is not particularly limited and may be appropriately selected depending on the intended purpose. The same solvents as the solvents raised as examples for the cleaning solution can be used.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

<Additive>

Ink may further optionally contain a surfactant, a defoaming agent, a preservative and fungicide, a corrosion inhibitor, a pH regulator, etc.

<Surfactant>

The surfactant may be the same surfactant as the surfactant that may be contained in the cleaning solution as one of the other components.

<Defoaming Agent>

The defoaming agent may be the same defoaming agent as the defoaming agent that may be contained in the cleaning solution as one of the other components.

<Preservative and Fungicide>

The preservatives and fungicides are not particularly limited. A specific example is 1,2-benzisothiazolin-3-on.

<Corrosion Inhibitor>

The corrosion inhibitor has no particular limit Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 through 12 and more preferably from 8 through 11 in terms of prevention of corrosion of metal materials contacting the ink.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

(Cleaning Solution Stored Container)

The cleaning solution stored container includes the cleaning solution of the present disclosure and a container storing the cleaning solution, and further includes other members as needed.

The container is not particularly limited and may be of any shape, any structure, any size, any material, etc. that may be appropriately selected depending on the intended purpose. Examples of the container include a container including at least, for example, an ink bag formed of aluminum laminate film or resin film.

(Inkjet Printing Apparatus and Inkjet Printing Method)

An inkjet printing apparatus of the present disclosure includes the set of an ink and a cleaning solution of the present disclosure, a printing head configured to discharge the ink in the set of an ink and a cleaning solution to perform printing, and a cleaning unit configured to clean any ink remaining in an ink flow path or the printing head with the cleaning solution in the set of an ink and a cleaning solution, and further includes other members as needed.

An inkjet printing method of the present disclosure includes a step of discharging the ink in the set of an ink and a cleaning solution of the present disclosure to perform printing and a cleaning step of cleaning any ink remaining in an ink flow path or a printing head with the cleaning solution in the set of an ink and a cleaning solution, and further includes other steps as needed.

Examples of the method for discharging the ink include a method of applying a pressure to the ink.

Examples of a unit configured to apply a pressure to the ink include a piezoelectric actuator (a laminated piezoelectric element and a thin-film piezoelectric element), a thermal actuator using an electro-thermal converting element such as a heating resistor, and an electrostatic actuator formed of a vibration plate and a counter electrode.

Examples of the printing head include a so-called piezo type (see Japanese Examined Patent Publication No. 02-51734) using a piezoelectric element as a pressure generating unit to pressurize an ink in an ink flow path to deform a vibration plate constituting a wall surface of the ink flow path and change the internal capacity of the ink flow path to discharge ink droplets, a so-called thermal type (see Japanese Examined Patent Publication No. 61-59911) using a heating resistor to heat an ink in an ink flow path and generate bubbles, and an electrostatic type (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

The cleaning step in the inkjet printing method of the present disclosure can be performed suitably by the cleaning unit, and may be performed by delivering the cleaning solution to, for example, a nozzle surface, an ink flow path, and a printing head to which the ink has attached with, for example, a dropper.

The ink used in the set of an ink and a cleaning solution of the present disclosure can be suitably applied to various printing apparatuses employing an inkjet printing method such as printers, facsimile machines, photocopiers, multi-function peripherals (serving as a printer, a facsimile machine, and a photocopier), and 3D model manufacturing devices.

In the present disclosure, the inkjet printing apparatus represents an apparatus capable of discharging ink, various processing fluids, etc. to a print medium, and the inkjet printing method represents a method performing printing using the apparatus. The print medium means an article to which the ink or the various processing fluids can be attached at least temporarily.

The inkjet printing apparatus may further optionally include a device relating to feeding, conveying, and ejecting the print medium and other devices referred to as a pre-processing device and a post-processing device in addition to the head portion to discharge the ink.

The inkjet printing apparatus may further optionally include a heater and a drier. The heater and the drier heat and dry the top surface and the bottom surface of a print medium having an image. The heater and the drier are not particularly limited. For example, a fan heater and an infra-red heater can be used. The print medium can be heated and dried before, during, and after printing.

The inkjet printing apparatus is not limited to those producing merely meaningful visible images such as texts and figures with the ink. For example, the inkjet printing apparatus can produce patterns like geometric design and 3D images.

In addition, the inkjet printing apparatus includes both a serial type apparatus in which the printing head is caused to move and a line type apparatus in which the printing head is not moved, unless otherwise specified.

Furthermore, in addition to the desktop type, the inkjet printing apparatus includes a wide type capable of printing images on a large print medium such as AO, and a continuous printer capable of using continuous paper wound up in a roll form as print media.

Figure 1:
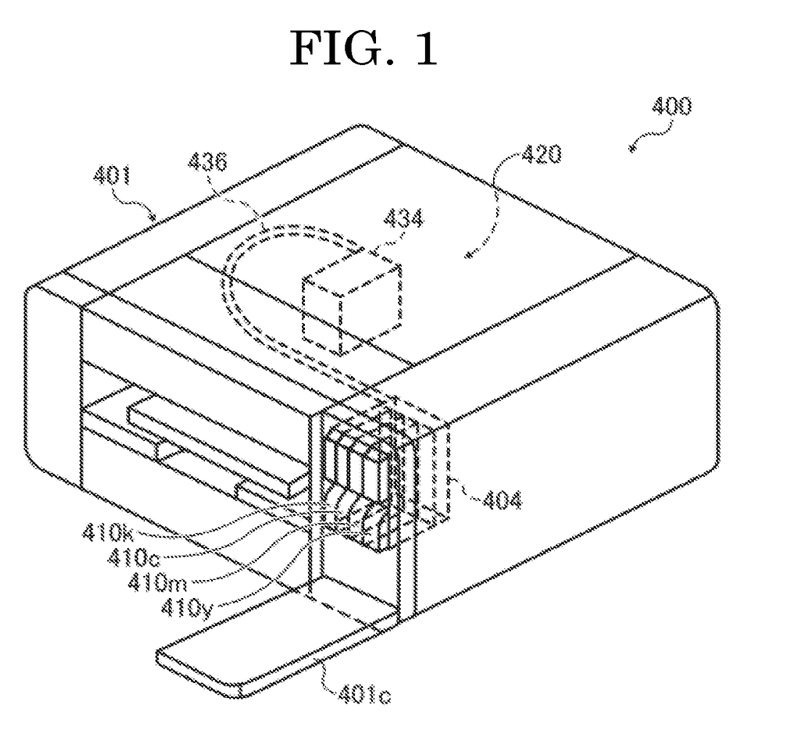
FIG. 1 is a perspective view illustrating an example of a serial-type image forming apparatus.
Figure 2:
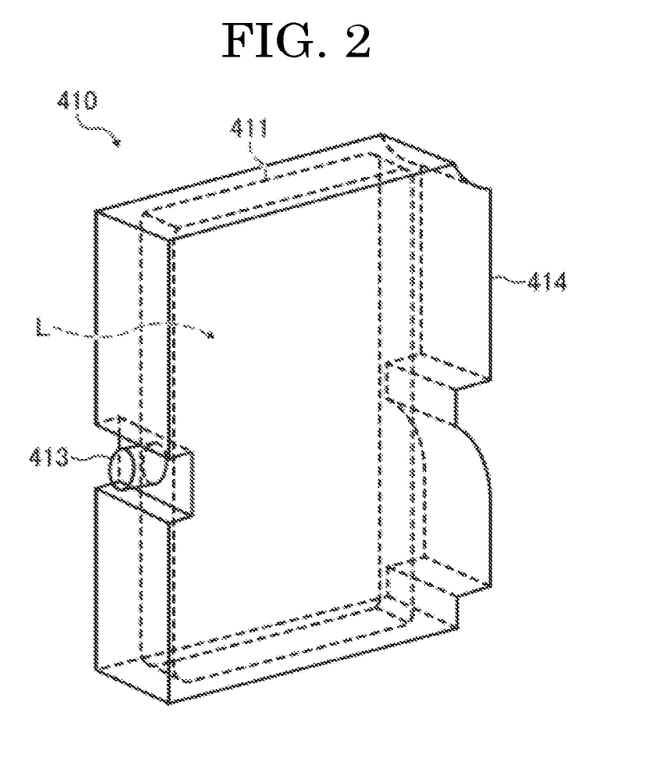
FIG. 2 is a perspective view illustrating an example of a main tank of the apparatus of FIG. 1.

The inkjet printing apparatus of the present disclosure is described using an example with reference to FIG. 1 and FIG. 2. FIG. 1 is a perspective view illustrating the inkjet printing apparatus. FIG. 2 is a perspective view illustrating the main tank. An image forming apparatus 400 as an example of the printing apparatus is a serial type image forming apparatus. A mechanical unit 420 is disposed in an exterior 401 of the image forming apparatus 400. Each ink accommodating unit 411 of each main tank 410 (410*k*, 410*c*, 410*m*, and 410*y*) for each color of black (K), cyan (C), magenta (M), and yellow (Y) is made of a packing member such as aluminum laminate film. The ink accommodating unit 411 is accommodated in a plastic housing unit 414. As a result, the main tank 410 is used as an ink cartridge of each color.

A cartridge holder 404 is disposed on the rear side of the opening when a cover 401*c* of the main body is opened. The cartridge holder 404 is detachably attached to the main tank 410. As a result, each ink discharging outlet 413 of the main tank 410 is communicated with a printing head 434 for each color via a supplying tube 436 for each color so that the ink can be discharged from the printing head 434 to a print medium.

EXAMPLES

The present disclosure will be described more specifically by way of Examples. The present disclosure should not be construed as being limited to these Examples.

(Resin Emulsion Preparation Example)
<Preparation of Polycarbonate-Based Urethane Resin Emulsion>

Under a nitrogen gas stream, polycarbonate diol (a reaction product of 1,6-hexanediol and dimethyl carbonate) (1,500 g), 2,2-dimethylolpropionic acid (DMPA) (220 g), and N-methylpyrrolidone (NMP) (1,347 g) were put in a reaction vessel to which a stirrer, a reflux condenser, and a thermometer were inserted, and heated to 60 degrees C. to dissolve DMPA. Subsequently, 4,4'-dicyclohexylmethane diisocyanate (1,445 g) and dibutyl tin dilaurate (catalyst) (2.6 g) were added to the reaction vessel, followed by heating to 90 degrees C. to allow the materials to undergo a urethanization reaction for 5 hours, to obtain a reaction mixture containing an isocyanate-terminated urethane prepolymer. The reaction mixture was cooled to 80 degrees C., and triethylamine (149 g) was added and mixed with the resultant. From the resultant, 4,340 g was extracted and added to a mixture solution of water (5,400 g) and triethylamine (15 g) under strong stirring. Subsequently, ice (1,500 g) was added to the resultant and a 35 percent by mass 2-methyl-1,5-pentanediamine aqueous solution (626 g) was added to the resultant to allow the materials to undergo a chain extension reaction. Solvents were evaporated from the resultant until the solid concentration became 30 percent by mass, to obtain a polycarbonate-based urethane resin emulsion.

The obtained polycarbonate-based urethane resin emulsion was coated on a glass slide to an average thickness of 10 μm and dried at 100 degrees C. for 30 minutes to produce a resin film Using a micro surface hardness tester (FISCHERSCOPE HM2000 available from Fischer Technology, Inc.), a Vickers indenter was indented into the resin film under a load of 9.8 mN. As a result, the surface hardness (Martens hardness) of the resin film was 120 N/mm$^2$.

(Pigment Dispersion Preparation Example 1)
<Preparation of Yellow Pigment Dispersion>

The internal space of a 1 L flask equipped with a mechanical stirrer, a thermometer, a nitrogen gas introducing tube, a reflux condenser, and a dropping funnel was purged with a nitrogen gas. Subsequently, styrene (11.2 g), acrylic acid (2.8 g), lauryl methacrylate (12 g), polyethylene glycol methacrylate (4 g), a styrene macromer (4 g), mercaptoethanol (0.4 g), and methyl ethyl ketone (40 g) were put in the flask and heated to 65 degrees C. Subsequently, a mixture liquid of styrene (100.8 g), acrylic acid (25.2 g), lauryl methacrylate (108 g), polyethylene glycol methacrylate (36 g), hydroxylethyl methacrylate (60 g), a styrene macromer (36 g), mercaptoethanol (3.6 g), azobismethylvaleronitrile (2.4 g), and methyl ethyl ketone (342 g) was dropped into the flask for 2.5 hours. Subsequently, a mixture liquid of azobismethylvaleronitrile (0.8 g) and methyl ethyl ketone (18 g) was dropped into the flask for 0.5 hours, and the materials in the flask were aged for 1 hour. Subsequently, azobismethylvaleronitrile (0.8 g) was added, and the materials in the flask were aged for 1 hour, to obtain a 50 percent by mass polymer solution (800 g).

The obtained polymer solution (28 g), C.I. pigment yellow 74 (product name: YELLOW NO. 43 available from Dainichiseika Color & Chemicals Mfg. Co., Ltd.) (26 g), a 1 mol/L potassium hydroxide aqueous solution (13.6 g), methyl ethyl ketone (20 g), and water (13.6 g) were stirred and then kneaded with a roll mill, to obtain a paste. The obtained paste was put in water (200 g) and stirred. From the resultant, methyl ethyl ketone and water were evaporated with an evaporator, to obtain a yellow pigment dispersion having a pigment proportion of 15 percent by mass and a solid concentration of 20 percent by mass.

(Pigment Dispersion Preparation Example 2)
<Preparation of Black Pigment Dispersion>

A black pigment dispersion having a pigment proportion of 15 percent by mass and a solid concentration of 20 percent by mass was obtained in the same manner as in Pigment dispersion preparation example 1, except that C.I. pigment yellow 74 used in Pigment dispersion preparation example 1 was changed to carbon black (product name: #45L available from Mitsubishi Chemical Corporation).

(Pigment Dispersion Preparation Example 3)
<Preparation of Magenta Pigment Dispersion>

A magenta pigment dispersion having a pigment proportion of 15 percent by mass and a solid concentration of 20 percent by mass was obtained in the same manner as in Pigment dispersion preparation example 1, except that C.I. pigment yellow 74 used in Pigment dispersion preparation example 1 was changed to pigment red 122 (product name: CROMOPHTHAL JET MAGENTA DMQ available from Ciba Specialty Chemicals Inc.).

(Pigment Dispersion Preparation Example 4)
<Preparation of Cyan Pigment Dispersion>

A cyan pigment dispersion having a pigment proportion of 15 percent by mass and a solid concentration of 20 percent by mass was obtained in the same manner as in Pigment dispersion preparation example 1, except that C.I pigment yellow 74 used in Pigment dispersion preparation example 1 was changed to pigment blue 15:3 (product name: CYANINE BLUE A-385 available from Dainichiseika Color & Chemicals Mfg. Co., Ltd.).

(Ink Preparation Example 1)
<Preparation of Ink 1>

An acrylic resin emulsion (product name: BONCOAT R-3380-E available from DIC Corporation, a solid concentration: 45 percent by mass, δH of HSP: 3.98 (cal/cm$^3$)$^{1/2}$) (5 percent by mass on a solid content basis), 1,3-butanediol (15 percent by mass), 1,2-propanediol (15 percent by mass), a fluorosurfactant (product name: ZONYL (registered trademark) FSO-100 available from Du Pont Kabushiki Kaisha) (1 percent by mass), the yellow pigment dispersion (20 percent by mass), and ion-exchanged water (balance, to total to 100 percent by mass) were added together, stirred for 1 hour, and subjected to pressure filtration through a polypropylene filter having an average pore diameter of 1.5 μm (product name: PROFILE STAR available from Pall Corporation) to remove coarse particles, to obtain an ink 1.

(Ink Preparation Examples 2 to 8)
<Preparation of Inks 2 to 8>

Inks 2 to 8 were obtained in the same manner as in Ink preparation example 1, except that the composition and proportions used in Ink preparation example 1 were changed to the composition and proportions presented in Table 1 below.

TABLE 1

| | | Ink | | | | | | | |
|---|---|---|---|---|---|---|---|---|---|
| | | 1 | 2 | 3 | 4 | 5 | 6 | 7 | 8 |
| Resin | Acrylic resin emulsion (δH of HSP: 3.98 (cal/cm³)^(1/2)) | 5 | 7 | 8 | — | — | 5 | 5 | 5 |
| | Polycarbonate-based urethane resin emulsion (δH of HSP: 5.24 (cal/cm³)^(1/2)) | — | — | — | 5 | — | — | — | — |
| | Polyether-based urethane resin emulsion (δH of HSP: 7.30 (cal/cm³)^(1/2)) | — | — | — | — | 5 | — | — | — |
| Coloring material | Yellow pigment dispersion | 20 | 20 | 20 | 20 | 20 | — | — | — |
| | Black pigment dispersion | — | — | — | — | — | 20 | — | — |
| | Magenta pigment dispersion | — | — | — | — | — | — | 20 | — |
| | Cyan pigment dispersion | — | — | — | — | — | — | — | 20 |
| Surfactant | Fluorosurfactant | 1 | 1 | 1 | 1 | 1 | 1 | 1 | 1 |
| Solvent | 1,3-butanediol | 15 | 15 | 15 | 15 | 15 | 15 | 15 | 15 |
| | 1,2-propanediol | 15 | 15 | 15 | 15 | 15 | 15 | 15 | 15 |
| Water | Ion-exchanged water | Balance | Balance | Balance | Balance | Balance | Balance | Balance | Balance |
| Total (percent by mass) | | 100 | 100 | 100 | 100 | 100 | 100 | 100 | 100 |

In Table 1, the proportions of the acrylic resin emulsion, the polycarbonate-based urethane resin emulsion, and the polyether-based urethane resin emulsion are values on a solid content basis.

In Table 1, the product names and supplier names of the components are as follows.

Fluorosurfactant: available from Du Pont Kabushiki Kaisha, product name: ZONYL (registered trademark) FSO-100

Acrylic resin emulsion: available from DIC Corporation, product name: BONCOAT R-3380-E, with a solid concentration of 45 percent by mass Polyether-based urethane resin emulsion: available from Taisei Fine Chemical Co., Ltd., product name: ACRIT WBR-016U, with a solid concentration of 30 percent by mass

1,3-Butanediol: available from Tokyo Chemical Industry Co., Ltd.

1,2-Propanediol: available from ADEKA Corporation (Synthesis Example of Compound 2 Represented by General Formula (1))

<Compound 2 Represented by General Formula (1), $R^1$ in General Formula (1): Ethyl Group>

N,N-dimethylacrylamide (19.828 g) and ethanol (19.868 g) were put in a 300 mL separable flask equipped with a stirrer, a thermocouple, and a nitrogen gas introducing tube, and stirred under introduction of a nitrogen gas. Subsequently, sodium-t-butoxide (0.338 g) was added, and the materials were allowed to undergo a reaction at 35 degrees C. for 4 hours. After the reaction was completed, phosphoric acid (150 mg) was added, and then the solution was homogenized and left to stand for 3 hours. The obtained solution was filtrated to remove a precipitate, and any unreacted material was removed with an evaporator, to obtain a compound 2 represented by general formula (1) below (3-ethoxy-N,N-dimethylpropionamide, $R^1$ in general formula (1): ethyl group).

General formula (1)

In general formula (1), $R^1$ represents an ethyl group.

Example 1

3-Ethyl-3-oxetanemethanol (δH of HSP: 6.05 (cal/cm³)^(1/2), specific gravity: 1.019) (20.0 percent by mass), 3-methoxy-3-methyl-1-butanol (δH of HSP: 6.29 (cal/cm³)^(1/2), specific gravity: 0.927) (10 percent by mass), 2-pyrrolidone (δH of HSP: 4.39 (cal/cm³)^(1/2), specific gravity: 1.10) (50 percent by mass), a fluorosurfactant (product name: ZONYL (registered trademark) FSO-100 available from Du Pont Kabushiki Kaisha) (1.00 percent by mass), a defoaming agent (2,4,7,9-tetramethyl-4,7-decanediol available from Nissin Chemical Co., Ltd.) (0.10 percent by mass), and ion-exchanged water (balance, to total to 100 percent by mass) were added together and stirred for 1 hour, to obtain a cleaning solution 1.

Examples 2 to 4 and Comparative Examples 1 and 2

Cleaning solutions 2 to 6 were obtained in the same manner as in Example 1, except that the composition and proportions used in Example 1 were changed to the composition and proportions presented in Table 2 below.

TABLE 2

|  |  | Example | | | | Comparative Example | |
|---|---|---|---|---|---|---|---|
|  |  | 1 | 2 | 3 | 4 | 1 | 2 |
| Cleaning solution No. |  | 1 | 2 | 3 | 4 | 5 | 6 |
| Solvent | 1,2-butanediol ($\delta$H of HSP: 9.37 (cal/cm$^3$)$^{1/2}$, specific gravity: 1.002) | — | — | — | 10.0 | — | 20.0 |
|  | 3-ethyl-3-oxctanemethanol ($\delta$H of HSP: 6.05 (cal/cm$^3$)$^{1/2}$, specific gravity: 1.019) | 20.0 | — | 70.0 | — | 60.0 | 40.0 |
|  | 3-methoxy-3-methyl-1-butanol ($\delta$H of HSP: 6.29 (cal/cm$^3$)$^{1/2}$, specific gravity: 0.927) | 10.0 | 20.0 | 20.0 | 20.0 | 8.0 | — |
|  | 1,3-butanediol ($\delta$H of HSP: 10.20 (cal/cm$^3$)$^{1/2}$, specific gravity: 1.005) | — | — | — | — | — | 20.0 |
|  | 2-pyrrolidone ($\delta$H of HSP: 4.39 (cal/cm$^3$)$^{1/2}$, specific gravity: 1.10) | 50.0 | — | — | 20.0 | 10.0 | — |
|  | Compound 1 represented by general formula (1) (R$^1$: methyl group, $\delta$H of HSP: 4.63 (cal/cm$^3$)$^{1/2}$, specific gravity: 0.99) | — | — | — | 30.0 | — | — |
|  | Compound 2 represented by general formula (1) (R$^1$: ethyl group, $\delta$II of IISP: 3.66 (cal/cm$^3$)$^{1/2}$, specific gravity: 0.97) | — | 60.0 | — | — | — | — |
| Surfactant | Fluorosurfactant | 1.00 | 1.00 | 1.00 | 1.00 | 1.00 | 1.00 |
| Defoaming agent | 2,4,7,9-tetramethyl-4,7-decanediol | 0.10 | 0.10 | 0.10 | 0.10 | 0.10 | 0.10 |
| Water | Ion-exchanged water ($\delta$H of HSP: 11.85 (cal/cm$^3$)$^{1/2}$, specific gravity: 1) | Balance | Balance | Balance | Balance | Balance | Balance |
| Total (percent by mass) |  | 100 | 100 | 100 | 100 | 100 | 100 |
| $\delta$H of HSP ((cal/cm$^3$)$^{1/2}$) of mixture solvent |  | 6.25 | 5.79 | 6.62 | 6.74 | 7.09 | 8.65 |

In Table 2, the product names and supplier names of the components are as follows.

1,2-Butanediol: available from Tokyo Chemical Industry Co., Ltd., with a specific gravity of 1.002

3-Ethyl-3-oxetanemethanol: available from Tokyo Chemical Industry Co., Ltd., with a specific gravity of 1.019

3-Methoxy-3-methyl-1-butanol: available from Kuraray Co., Ltd., with a specific gravity of 0.927

1,3-Butanediol: available from Tokyo Chemical Industry Co., Ltd., with a specific gravity of 1.005

2-Pyrrolidone: available from Tokyo Chemical Industry Co., Ltd., with a specific gravity of 1.10

Compound 1 represented by general formula (1): available from Idemitsu Kosan Co., Ltd., with $\delta$H of HSP of 4.63 (cal/cm$^3$)$^{1/2}$ and a specific gravity of 0.99

General formula (1)

In general formula (1), R$^1$ represents a methyl group.

Fluorosurfactant: available from Du Pont Kabushiki Kaisha, product name: ZONYL (registered trademark) FSO-100

Defoaming agent: 2,4,7,9-tetramethyl-4,7-decanediol available from Nissin Chemical Co., Ltd.

Example 5

The ink 1 and the cleaning solution 1 were combined to make a set 1 of an ink and a cleaning solution.

Examples 6 to 15 and Comparative Examples 3 and 4

Sets 2 to 13 of an ink and a cleaning solution were made in the same manner as in Example 5, except that the combination of Example 5 was changed to the combinations presented in Table 3 below.

Using the obtained sets of an ink and a cleaning solution, "cleanability", "discharging stability", and "fixability" were evaluated in the manners described below. The results are presented in Table 3 below.

(Cleanability)

A SUS316 plate (3 cm×4 cm) was immersed in the ink of each set of an ink and a cleaning solution for 60 minutes. Subsequently, the SUS316 plate was left to stand still and dried under the atmosphere at a pressurizing condition of 0.1 MPa at normal temperature (25 degrees C.) for 2 hours, to obtain the SUS316 plate to which a dried, solidified product of the ink was attached.

The obtained SUS316 plate to which the dried, solidified product of the ink was attached was cleaned for 3 minutes by repetitive pouring of the cleaning solution (30 mL) of each set of an ink and a cleaning solution. After cleaning by pouring was completed, the SUS316 plate was visually observed to evaluate "cleanability" according to the evaluation criteria described below.

[Evaluation Criteria]

A: The dried, solidified product of the ink became completely unobservable during an initial period (within 1 minute from the start) of cleaning by repetitive pouring.

B: The dried, solidified product of the ink became completely unobservable when cleaning by repetitive pouring was completed.

C: A slight remainder of the dried, solidified product of the ink was observed.

D: No change was observed in the dried, solidified product of the ink between before and after cleaning.

(Discharging Stability)

With a printer (apparatus name: IPSIO GX E3300 available from Ricoh Co., Ltd.), the ink of each set of an ink and a cleaning solution was discharged continuously for 45 minutes. The surface of the printing head was dried for 30 minutes since discharging was stopped. Subsequently, the cleaning solution (3 mL) was delivered to the nozzle surface of the printing head with a dropper, and the nozzle surface was wiped. Then, the ink was discharged again to evaluate "discharging stability" according to the evaluation criteria described below.

[Evaluation Criteria]

A: There was no discharging disorder or discharging failure at all.

B: There was discharging disorder or discharging failure at 5 or less nozzles.

C: There was discharging disorder or discharging failure at more than 5 nozzles.

(Fixability)

With an inkjet printer (apparatus name: IPSIO GX5000 available from Ricoh Co., Ltd.) loaded with the ink of each set of an ink and a cleaning solution, printing was performed on TYPE 6200 paper (available from NBS Ricoh Co., Ltd.) at a resolution of 600 dpi. Subsequently, filter paper (product name: CIRCULAR QUANTITATIVE FILTER PAPER NO. 6 available from Advantec Co., Ltd.) was pressed against the printed portion to visually observe the state of transfer of the ink to the filter paper and evaluate "fixability" according to the evaluation criteria described below.

[Evaluation Criteria]

A: Almost no ink was transferred.
B: Some part of the ink was transferred.
C: Much of the ink was transferred.
D: Most of the ink was transferred.

Aspects of the present disclosure was as follows, for example.

<1> A cleaning solution used for cleaning an ink containing a resin in an amount of 5 percent by mass or greater, the cleaning solution including a mixture solvent containing water and a solvent,
wherein a hydrogen bond term of a Hansen solubility parameter of the mixture solvent is 7.0 $(cal/cm^3)^{1/2}$ or less.

<2> The cleaning solution according to <1>,
wherein a hydrogen bond term of a Hansen solubility parameter of the solvent is 5.0 $(cal/cm^3)^{1/2}$ or less.

<3> The cleaning solution according to <1> or <2>,
wherein the solvent contains a compound represented by general formula (1) below, General formula (1)

where in general formula (1), $R^1$ represents an alkyl group containing 1 or more but 4 or less carbon atoms.

<4> The cleaning solution according to <3>,
wherein $R^1$ in general formula (1) is an alkyl group containing 1 or more but 2 or less carbon atoms.

<5> The cleaning solution according to any one of <1> to <4>,
wherein a proportion of the water in the cleaning solution is 10 percent by mass or greater but 30 percent by mass or less of a total amount of the cleaning solution.

<6> The cleaning solution according to <5>,
wherein the proportion of the water in the cleaning solution is 10 percent by mass or greater but 20 percent by mass or less of the total amount of the cleaning solution.

<7> The cleaning solution according to any one of <1> to <6>, further including
a surfactant.

<8> The cleaning solution according to <7>,
wherein the surfactant is a fluorosurfactant.

<9> The cleaning solution according to <8>,
wherein the fluorosurfactant is 2-perfluoroalkylethanol.

<10> A set of an ink and a cleaning solution, the set including: an ink; and
a cleaning solution,

TABLE 3

| | Ink No. | Cleaning solution No. | Difference $(cal/cm^3)^{1/2}$ in δH of HSP between resin and mixture solvent | Evaluation result | | |
| --- | --- | --- | --- | --- | --- | --- |
| | | | | Cleanability | Discharging stability | Fixability |
| Example | 5 | 1 | 1 | 2.27 | A | B | A |
| | 6 | 2 | 1 | 2.27 | A | B | A |
| | 7 | 3 | 1 | 2.27 | A | B | A |
| | 8 | 4 | 1 | 1.10 | B | B | A |
| | 9 | 5 | 1 | 1.05 | B | B | A |
| | 10 | 6 | 1 | 2.27 | A | B | A |
| | 11 | 7 | 1 | 2.27 | A | B | A |
| | 12 | 8 | 1 | 2.27 | A | B | A |
| | 13 | 4 | 2 | 0.55 | A | A | A |
| | 14 | 5 | 3 | 0.68 | B | B | A |
| | 15 | 5 | 4 | 0.56 | A | A | A |
| Comparative Example | 3 | 5 | 5 | 0.21 | D | C | A |
| | 4 | 5 | 6 | 3.41 | D | C | A | wherein the ink contains a resin,
wherein a proportion of the resin is 5 percent by mass or greater of a total amount of the ink,
wherein the cleaning solution is the cleaning solution according to any one of <1> to <9>.
<11> The set according to <10>.
wherein a difference between a hydrogen bond term of a Hansen solubility parameter of the resin and the hydrogen bond term of the Hansen solubility parameter of the mixture solvent in the cleaning solution is 1.0 $(cal/cm^3)^{1/2}$ or less.
<12> The set according to <10> or <11>,
wherein a hydrogen bond term of a Hansen solubility parameter of the resin in the ink is 8 $(cal/cm^3)^{1/2}$ or less.
<13> The set according to any one of <10> to <12>,
wherein the resin in the ink is at least one selected from the group consisting of an acrylic resin, a polycarbonate-based urethane resin, and a polyether-based urethane resin.
<14> The set according to any one of <10> to <13>,
wherein the proportion of the resin in the ink is 5 percent by mass or greater but 30 percent by mass or less of the total amount of the ink.
<15> The set according to any one of <10> to <14>,
wherein the ink further contains a coloring material.
<16> The set according to <15>,
wherein the coloring material is a pigment.
<17> The set according to any one of <10> to <16>,
wherein a viscosity of the ink at 25 degrees C. is 5 mPa·s or greater but 30 mPa·s or less.
<18> The set according to any one of <10> to <17>, wherein a surface tension of the ink at 25 degrees C. is 35 mN/m or less.
<19> A cleaning solution stored container including:
the cleaning solution according to any one of <1> to <9>; and
a container storing the cleaning solution.
<20> An inkjet printing apparatus including:
the set according to any one of <10> to <18>;
a printing head configured to discharge the ink in the set to perform printing; and
a cleaning unit configured to clean any ink remaining in an ink flow path or the printing head with the cleaning solution in the set.
<21> An inkjet printing method including:
a step of discharging the ink in the set according to any one of <10> to <18> to perform printing; and
a cleaning step of cleaning any ink remaining in an ink flow path or a printing head with the cleaning solution in the set.

The cleaning solution according to any one of <1> to <9>, the set according to any one of <10> to <18>, the cleaning solution stored container according to <19>, the inkjet printing apparatus according to <20>, and the inkjet printing method according to <21> can solve the various problems in the related art and achieve the object of the present disclosure.

What is claimed is:
1. A cleaning solution used for cleaning an ink that comprises a resin in an amount of 5 percent by mass or greater, the cleaning solution comprising
a mixture solvent comprising a compound represented by general formula (1) below, General formula (1)

where in general formula (1), $R^1$ represents an alkyl group that comprises 1 or more but 4 or less carbon atoms,
wherein a hydrogen bond term of a Hansen solubility parameter of the mixture solvent is 7.0 $(cal/cm^3)^{1/2}$ or less.
2. The cleaning solution according to claim 1, wherein a hydrogen bond term of a Hansen solubility parameter of the solvent is 5.0 $(cal/cm^3)^{1/2}$ or less.
3. The cleaning solution according to claim 1, wherein $R^1$ in general formula (1) is an alkyl group that comprises 1 or more but 2 or less carbon atoms.
4. The cleaning solution according to claim 1, wherein a proportion of the water in the cleaning solution is 10 percent by mass or greater but 30 percent by mass or less of a total amount of the cleaning solution.
5. The cleaning solution according to claim 1, further comprising a surfactant.
6. The cleaning solution according to claim 5, wherein the surfactant comprises a fluorosurfactant.
7. The cleaning solution according to claim 6, wherein the fluorosurfactant comprises 2-perfluoroalkylethanol.
8. A cleaning solution stored container comprising:
the cleaning solution according to claim 1; and
a container storing the cleaning solution.
9. A set of an ink and a cleaning solution, the set comprising:
an ink; and
a cleaning solution,
wherein the ink comprises a resin,
wherein a proportion of the resin is 5 percent by mass or greater of a total amount of the ink,
wherein the cleaning solution is a cleaning solution used for cleaning an ink that comprises a resin in an amount of 5 percent by mass or greater, wherein the cleaning solution comprises a mixture solvent comprising compound represented by general formula (1) below, General formula (1)

where in general formula (1), $R^1$ represents an alkyl group that comprises 1 or more but 4 or less carbon atoms, and
wherein a hydrogen bond term of a Hansen solubility parameter of the mixture solvent is 7.0 $(cal/cm^3)^{1/2}$ or less.
10. The set according to claim 9, wherein a difference between a hydrogen bond term of a Hansen solubility parameter of the resin and the hydrogen bond term of the Hansen solubility parameter of the mixture solvent in the cleaning solution is 1.0 $(cal/cm^3)^{1/2}$ or less.
11. The set according to claim 10, wherein the hydrogen bond term of the Hansen solubility parameter of the resin in the ink is 8 $(cal/cm^3)^{1/2}$ or less.
12. The set according to claim 9, wherein the resin in the ink comprises at least one selected from the group consisting of an acrylic resin, a polycarbonate-based urethane resin, and a polyether-based urethane resin.
13. The set according to claim 9, wherein the proportion of the resin in the ink is 5 percent by mass or greater but 30 percent by mass or less of the total amount of the ink.

14. The set according to claim 9, wherein the ink further comprises a coloring material.

15. The set according to claim 14, wherein the coloring material comprises a pigment.

16. The set according to claim 9, wherein a viscosity of the ink at 25 degrees C. is 5 mPa·s or greater but 30 mPa·s or less.

17. The set according to claim 9, wherein a surface tension of the ink at 25 degrees C. is 35 mN/m or less.

18. An inkjet printing apparatus comprising:
a set of an ink and a cleaning solution;
a printing head configured to discharge the ink in the set to perform printing; and
a cleaning unit configured to clean any ink remaining in an ink flow path or the printing head with the cleaning solution in the set,
wherein the ink comprises a resin,
wherein a proportion of the resin is 5 percent by mass or greater of a total amount of the ink,
wherein the cleaning solution is a cleaning solution used for cleaning an ink that comprises a resin in an amount of 5 percent by mass or greater, wherein the cleaning solution comprises a mixture solvent comprising a compound represented by general formula (1) below, General formula (1)

where in general formula (1), $R^1$ represents an alkyl group that comprises 1 or more but 4 or less carbon atoms, and
wherein a hydrogen bond term of a Hansen solubility parameter of the mixture solvent is 7.0 $(cal/cm^3)^{1/2}$ or less.

19. An inkjet printing method comprising:
discharging the ink in the set according to claim 9 perform printing; and
cleaning any ink remaining in an ink flow path or a printing head with the cleaning solution in the set.

* * * * *